Patented Oct. 10, 1939

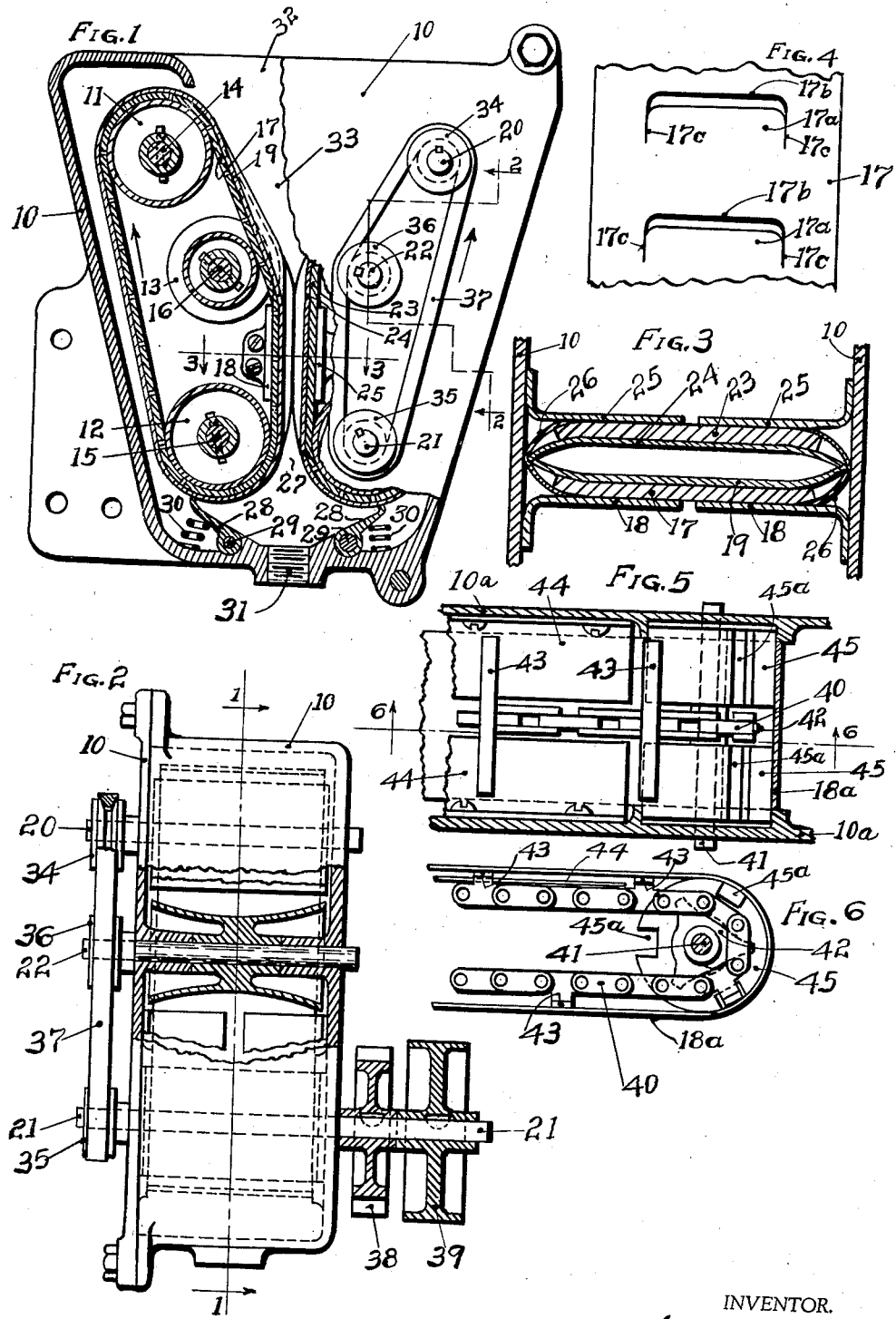

2,175,275

UNITED STATES PATENT OFFICE 2,175,275

MEAT FEEDING MACHINE

August J. Meyer, Oak Park, Ill., assignor of one-half to Alvin D. Blieden, Chicago, Ill.

Application June 2, 1938, Serial No. 211,411

15 Claims. (Cl. 226—69)

My invention consists of an improved machine for feeding meat or meat products in ground or chopped condition to containers for receiving, holding and/or shipping the meat, under such pressure that the meat is firmly packed in the containers to exclude entrapped air and to utilize the entire volume of the containers. The ground or chopped meat or meat product may be of any desired kind or combination, and either seasoned or unseasoned, depending upon its intended use, and it may, if desired, for some purposes, include other constituents than meat. The containers may be of any kind adapted to the purpose in any case, such as casings for sausage meat, cans or jars for other ground, chopped or compounded meats, or any suitable containers adapted to hold and/or preserve the meat or meat product.

In the past, various types of machines have been proposed for the purpose of feeding and packing ground or chopped meat and meat products, such as machines provided with cylinders for holding the meat to be fed and packed, in which the meat is fed and pressed by air under pressure, either with or without the use of pistons, or other machines of similar cylinder and piston construction having mechanically operated pistons, all of which machines have been open to the objection and possess the serious disadvantage of being intermittent in operation, that is to say, only a limited charge of the meat or meat product can be put into the machine at any one time, and after the feeding and packing of that charge, the operation of the machine is of necessity stopped, the machine is opened and cleaned, and a fresh charge of meat or meat product is inserted, and then the operation of the machine is resumed, the duration of the charging periods frequently being equal to or greater than the duration of the discharging periods.

By my invention, I provide a machine capable of continuous feeding and packing operation, by using endless cooperating belts or conveyors constructed and operating to positively engage the meat or meat product between them and feed the same from the inlet compartment of the machine into the enclosed delivery compartment thereof, the positive feeding of the meat serving to develop any desired pressure in the delivery compartment, that is found necessary or advisable to force the meat through the outlet opening of the delivery compartment and into any desired container connected therewith.

Meat and meat products always contain more or less fat which makes it difficult if not impossible to secure the requisite adhesion with smooth and flat feeding surfaces, to positively feed the meat and develop the required pressure on the discharged meat to properly pack it in containers. On the other hand, where the feeding members are not smooth and flat, but include in some cases in one way or another projecting parts, or in other cases recesses and more or less pronounced reentrant angles, it is impossible to clean the feeding members during the operation of the machine, and the meat soon becomes so tightly packed around said projecting parts or in said recesses as to interfere with the operation of the machine, as a result of which, the machine must be stopped frequently and cleaned at the expense of considerable time and labor; furthermore, with feeding members of this class, although the projecting parts or recesses may positively engage and feed part of the meat mass going through the machine, on account of the fatty nature of the mass, only its external parts will be so fed and the inner part of the mass will slip easily on its external parts, and as a result, said inner part will not be positively fed, the churning or kneading action in the mass frequently changing the nature, consistency or texture of the mass in an undesirable manner.

By my invention, I employ smooth and normally flat feeding surfaces readily susceptible of thorough cleaning as a cyclic operation immediately after each feeding action of said surfaces, without stopping or in any way modifying the speed of operation of the machine, so that the meat feeding proceeds continuously with the development of desired pressure on the meat discharged from the machine for as long a time as may be desired, which time is limited only by the supplying of meat to the machine and the removal of the meat discharged from the machine, usually in containers brought into engagement, one after another, with the discharge opening of the machine and removed as soon as they are filled, by any suitable means, the meat supplying means and the means for removing the discharged meat, not being shown herein as they do not constitute a part of the present invention.

To secure the continuous feeding operation referred to, I employ two endless feeding belts of firm but flexible material made, for example, of rubber compound or of other gum or resinous material either with or without internal reinforcement such as fibrous material, the only requisites being that the belts shall have smooth and continuous outer surfaces that are normally flat, that they shall be sufficiently resilient to readily and without the application of much pressure bend around the several rollers employed to guide and drive them, that they shall have sufficient firmness to stand without appreciable deformation the lateral pressures exerted on the meat during the feeding of the same through the machine, that they shall have sufficient elasticity to readily form the pockets below described as incident to the feeding of the meat, and that they shall be resistant to the action of water, and to the action of the fat and other constituents of the meat or meat product to be handled by the machine.

The feeding belts are supported by driving belts closely fitting the inner surfaces of the feeding belts, which driving belts are endless and of any material suitable to afford stable support for the feeding belts, to have the flexibility to bend readily around the rollers employed, and to have the strength necessary to operate the feeding belts. While it is desirable that the material of the driving belts shall be resistant to the action of water and to the fat and other constituents of the meat or meat product to be handled by the machine, it is also desirable that they shall have little if any elasticity or stretch, since their function is to unyieldingly drive the feeding belts and afford as unyielding a support for said feeding belts as possible. I find that satisfactory material for said driving belts, is firm fabric belting impregnated with rubber or other resinous compound, it being preferable both with the feeding belts and the driving belts to use a resinous compound resistant to the action of fats, since some rubber compounds are not highly resistant to the action of some fats and oils.

The feeding belts supported as above described on the driving belts, are mounted to have downward and converging runs in the inlet compartment of the machine, bringing said feeding belts relatively close together at the bottom of the inlet compartment, where they pass between parallel pressure plates from the lower ends of which they enter the discharge compartment of the machine where they separate and deliver the fed meat or product, after which they are cleaned and return to the upper end of the inlet compartment.

The driving belts are provided throughout their lengths, with spaced flaps of substantial size leaving outside of and between them, sufficient continuous material of said belts to possess the requisite strength to positively drive the feeding belts.

In the lower portion of the inlet compartment, the driving belts are so supported as to permit their flaps to gradually and increasingly extend outwardly under the lateral pressure of the meat or product on the feeding belts, until at the lower portion of the inlet compartment, substantial pockets are formed in the feeding belts by the stretching and distension of the material thereof, into the spaces previously occupied by the flaps of the driving belts. This is caused by the lateral pressure of the meat or product on the feeding belts, and fills said pockets with the meat or product, thus establishing positive feeding engagement between the feeding belts and the meat or product. Downward movement of the feeding belts increases the lateral pressure on the meat or product, and the converging of the feeding belts moves the entire meat mass in the lower end of the inlet compartment between the upper ends of the parallel pressure plates, and in so doing the flaps of the driving belts are forced back into their openings in said belts, thereby flattening out the pockets in the feeding belts and so greatly increasing the lateral pressure on the meat or product, that for the time it acts substantially as a solid mass, in which condition it is forced between the pressure plates and into the discharge compartment, with no appreciable kneading action in the mass of the meat or product. This action is further effected by making the meat stream between the pressure plates relatively wide and thin. In this manner, the meat or product is positively fed to the discharge compartment, and has any desired pressure exerted upon it in said compartment, said pressure being determined by the rate of feeding the meat to said compartment and the rate of discharging it therefrom.

I also illustrate below an alternative construction of driving belts consisting of endless chains and cross members, which support and drive the feeding belts in substantially the manner described to accomplish substantially the same result.

My invention will be best understood by reference to the accompanying drawing illustrating a preferred embodiment thereof, in which Fig. 1 illustrates my machine partially in end elevation, and partly in central, vertical sectional view taken along the line 1—1 in Fig. 2;

Fig. 2 is a view showing my machine partially in side elevation and partly in vertical, sectional view taken along the line 2—2 in Fig. 1;

Fig. 3 is a horizontal, sectional view to an enlarged scale, of a part of the construction shown in Fig. 1, taken along the line 3—3 in the latter figure;

Fig. 4 shows in front elevation to an enlarged scale, part of one of the driving belts shown in Fig. 1;

Fig. 5 shows in vertical, central, sectional view, a portion of a construction of my machine modified to use endless chains and cross members as driving belts, instead of the construction of driving belts shown in Figs. 1 to 4 inclusive, and Fig. 6 is a horizontal, sectional view of the parts shown in Fig. 5, taken along the line 6—6 in the latter figure.

Similar numerals refer to similar parts throughout the several views.

As shown in Fig. 1, my machine consists of a casing 10 having side, end, top and bottom walls, the side walls being inclined and converging downwardly, and the end walls being substantially parallel. To the left of the vertical center line of the machine as seen in Fig. 1, three rollers 11, 12 and 13 are supported in parallel relation on and are rigidly secured to shafts 14, 15 and 16 respectively which extend through and are supported for rotation by the end walls of the casing 10. The rollers 11 and 12 are cylindrical and the roller 13, as more clearly shown in Fig. 2, has a surface that is concave longitudinally, the end portions of the roller 13 being shown as having substantially the same diameter as the rollers 11 and 12.

An endless driving belt 17 extends tightly around the rollers 11, 12 and 13, and between the rollers 13 and 12 said belt presses tightly against pressure plates 18 secured to and supported by the end walls of the casing 10, around which pressure plates the belt 17 extends, one of said pressure plates being shown in Fig. 1. The driving belt 17 supports an endless feeding belt 19 which tightly engages it, said belts being of any suitable material, for example, as above described.

As shown in Fig. 4, the driving belt 17 is provided with flaps 17a each of which is cut from the material of the belt by a transverse slit 17b and short longitudinal slits 17c, in such a manner that one of the longer edges of each flap remains integral with the material of the driving belt and is the leading edge of said flap as the driving belt moves around the rollers and pressure plates described.

To the right of the vertical center line of the machine as shown in Fig. 1, shafts 20, 21 and 22 extend through and are supported for rotation by the end walls of the casing 10, said shafts having a relation to each other and to the vertical center line of the machine that is symmetrical to the relation of the shafts 14, 15 and 16 to each other and to said center line. Within the machine, the shafts 20, 21 and 22 support and have secured to them rollers of the same shape and size respectively as the rollers above described as supported by the shafts 14, 15 and 16, to in turn support a driving belt 23 and a feeding belt 24 in the same manner, of the same material and for the same purpose as above described for the belts 17 and 19. Between the shafts 22 and 21, the belts 23 and 24 surround and press against pressure plates 25 secured to the end walls of the casing 10, one of said pressure plates being shown in Fig. 1.

As shown in Fig. 3, a U-shaped guide member 26 is mounted between the pressure plates 18 and 25 adjacent each of the end walls of the casing 10, to press the edge portions of the feeding belts 19 and 24 firmly against each other as they pass downwardly between said pressure plates. Said guide members extend from the concave rollers carried by the shafts 16 and 22 downwardly to substantially horizontal alignment with the shafts 15 and 21, as a result of which the lower portions of said guide members support the edge portions of the feeding belts 19 and 24 against the pressure developed on the meat in the discharge compartment 27 of the machine, and seal the corresponding edge portions of said belts against leakage from said compartment. From the lower ends of said guide members 26, the feeding belts 19 and 24 bend around the cylindrical rollers carried by the shafts 15 and 21, said belts being of a width to closely fit the end walls of the casing 10 as they pass around the latter rollers in the discharge compartment 27, the curved condition of the belts preventing bending of the edge portions of the belts below the members 26 by the pressure in the discharge compartment and preventing leakage from said compartment. Each of the feeding belts 19 and 24, as shown for the feeding belt 19 in Fig. 1, is engaged at its lowermost portion by a scraper plate 28 pivotally mounted on a rod 29 substantially parallel with the shaft 15, and held forcibly against the feeding belt by a spring 30 of sufficient strength to so hold said scraper plate against any operating pressures developed in the discharge compartment 27, said scraper plates being of a length to closely engage at their ends, the inner surfaces of the end walls of the casing 10, to complete the bounding walls of the discharge compartment 27 and to prevent leakage therefrom. The discharge compartment 27 is provided with an outlet opening 31 of restricted size, to which any suitable devices may be connected, for conducting the meat from the compartment 27 to the containers to be packed, for example, to casings if sausage is to be packed, or to metal or other containers if the meat or meat product is to be packed in cans or jars, the pressure developed in the discharge compartment being available to firmly pack the meat or meat product in the containers, as desired.

The top wall of the casing 10, as shown in Fig. 1, is provided with an inlet opening 32 of relatively large size, to facilitate placing the meat or meat product to be packed, in the inlet compartment 33 of the machine.

As shown in Fig. 1, the front ends of the shafts 20, 21 and 22 have secured thereto V-pulleys 34, 35 and 36, tightly engaged by an endless V-belt 37. The front ends of the shafts 14, 15 an 16 (which are removed in Fig. 1), are similarly connected by similar V-pulleys and a similar endless V-belt. As shown in Fig. 2, the shaft 21 has also rigidly secured thereto, a spur gear 38 which meshes with a similar spur gear of the same size, not shown, secured to the shaft 15. The shaft 21 also has secured thereto a pulley 39 by which driving energy may be communicated to the machine from any suitable source of motive power, not shown.

As a result of the external belt and gear connections described, the machine is operated by rotating the pulley 39 to turn the shaft 21 to move the V-belt 37 in the direction indicated by the arrow in Fig. 1; the gear 38 and its companion gear on the shaft 15, effect the rotation of the shaft 15, and the V-belt, not shown, connecting the shafts 14, 15 and 16 drives said shafts to move the feeding belt 19 and the driving belt 17 in the direction indicated by the arrow in Fig. 1. The sizes of the driving gears and pulleys are preferably such that the shafts 14, 15, 16, and 20, 21, 22 are rotated at substantially the same rate, the shafts 14, 15 and 16 being rotated in one direction to move the driving belt 17 and the feeding belt 19 operated thereby, downwardly between the pressure plates 18 and 25, and the shafts 20, 21 and 22 being rotated in the reverse direction to move the internal driving belt and feeding belt operated thereby, downwardly between the pressure plates 18 and 25, and at substantially the same rate as the driving belt 17 and the feeding belt 19 are moved.

In operating the machine, with the internal driving belts and the feeding belts in motion as described, the ground or chopped meat or meat product is fed through the inlet opening 32 into the inlet compartment 33, by any desired means whether automatic or manual, and the converging runs of the feeding belts move the meat or meat product downwardly in the inlet compartment, at the same time lightly compressing it. The concave shape of the rollers carried by the shafts 16 and 22, causes the feeding belts to become trough shaped between the rollers on the shafts 14 and 20, and the upper ends of the pressure plates 18 and 25, the internal driving belts being somewhat narrower than the feeding belts operated thereby, to permit this to occur. This affords better adhesion between the feeding belts and the meat or meat product, than if the feeding belts were flat. Below the concave rollers, the pressure laterally on the feeding belts has developed sufficiently to displace the flaps of the internal driving belts outwardly from the planes of said belts, due to the elastic nature of the feeding belts which follow up the displacement of said flaps, thereby forming pockets in said feeding belts. In this way, although the main portions of the feeding belts continue to approach each other by the convergence of the belts, the pocket formations referred to resulting from the lateral pressure on the meat or meat product just below the concave rollers, serve to reduce said lateral pressures somewhat and to prevent a marked increase in said lateral pressure, but at the same time, with the lateral flow to relieve said lateral pressure, the meat or meat product fills said pockets and a substantial amount of the downwardly moving meat stream is contained in said pockets and is so positively held thereby and moved downwardly that it is incapable of upward movement in a manner to churn or knead the meat or meat product. This continues to the upper ends of the pressure plates 18 and 25, which are close enough together, so that as the portions of the meat or meat product held in the pockets reach the upper ends of the pressure plates, there is practically no opportunity for upward flow of the meat stream on account of the thinness of said stream, and as the trailing flaps of the internal driving belts enter between the upper ends of the pressure plates, said flaps are pressed thereby back into their openings in said driving belts, thereby flattening the corresponding pockets in the feeding belts and compressing the meat or meat product into a solid mass which is moved by the feeding belts downwardly between the pressure plates and delivered into the discharge compartment of the machine. The feeding belts are then scraped clean by the scraper plates described, and the feeding belts are then ready to again engage and feed the meat or meat product in the inlet compartment of the machine.

By developing lateral pressures on the meat or meat product during its feeding, in the manner described, resultant upward pressures therein are practically avoided, and in any event such upward pressures are so small as to produce no undesirable internal movement in the mass of the meat or meat product being fed.

The pressure developed in the discharge compartment of the machine for packing purposes, is determined by the relation of the restriction of discharge from said compartment to the rate of delivering meat or meat product into said compartment, and also within practical limits, by the rate of operation of the machine.

In Figs. 5 and 6, I illustrate a modified construction by which the internal driving belts above described are each replaced by an endless chain 40 supported at each end by a shaft 41 carrying a centrally supported sprocket wheel 42 engaging said chain. One of said shafts may be a driving shaft for said chain, and the other of said shafts may be an idler shaft. At regularly spaced intervals along the length of the chain, its links have secured to bosses projecting outwardly therefrom a small amount, the central portions of flat cross members 43, so that said cross members may ride on their inner surfaces, on the outer surfaces of supporting and guiding plates 44 secured to the end walls of the casing 10a of the machine, said plates being spaced from each other sufficiently at their inner longitudinal edges, to permit the link bosses to move freely between them. A feeding belt 18a of the same construction and for the same purpose as the feeding belt 19 above described, is mounted around the chain 40 and supported by the cross members 43, each end portion of said feeding belt being supported by rollers 45 having longitudinal grooves 45a in their surfaces to clear the cross members 43, one of said rollers being on each side of the sprocket wheel 42.

The guide plates 44 may be shaped as desired to form pockets in the feeding belt 18a substantially as and for the purpose above described, and with this construction none of the rollers supporting and guiding the chains need be concave. This modified construction of machine has substantially the same operation and produces substantially the same result as the construction shown and described in connection with Figs. 1 to 4 inclusive, excepting that with the construction of Figs. 5 and 6, feeding pockets in the feeding belts 18a, may be maintained through the entire run of the belts between the pressure plates and into the discharge compartment of the machine, determined in depth by the thickness of the cross members 43.

The machine described may be used to feed and pack ground and chopped meat and meat products, or in fact any subdivided products adapted to be operated upon as above described.

While I have shown my invention in the particular embodiment above described, it will be understood that I do not limit myself thereto, as I may employ equivalents thereof without departing from the scope of the appended claims.

What I claim is:

1. In a machine for feeding subdivided meat and like material, the combination of a casing containing an inlet compartment and an enclosed discharge compartment, spaced pressure plates in said casing forming a passageway connecting said compartments, driving belts mounted for movement in said inlet compartment towards each other and towards and between said pressure plates and through said discharge compartment, and feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment.

2. In a machine for feeding subdivided meat and like material, the combination of a casing containing an inlet compartment and an enclosed discharge compartment, spaced pressure plates in said casing forming a passageway connecting said compartments, driving belts mounted for movement in said inlet compartment towards each other and towards and between said pressure plates and through said discharge compartment, imperforate feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, and devices in said discharge compartment and engaging the feeding surfaces of said feeding belts to clean the latter before they leave said discharge compartment.

3. In a machine for feeding subdivided meat and like material, the combination of a casing containing an inlet compartment and an enclosed discharge compartment, spaced pressure plates in said casing forming a passageway connecting said compartments, driving belts mounted for movement in said inlet compartment towards each other and towards and between said pressure plates and through said discharge compartment, and imperforate feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, said driving and said feeding belts being endless and wholly contained in said casing.

4. In a machine for feeding subdivided meat and like material, the combination of a casing containing an inlet compartment and an enclosed discharge compartment, spaced pressure plates in said casing forming a passageway connecting said compartments, driving belts mounted for movement in said inlet compartment towards each other and towards and between said pressure plates and through said discharge compartment, feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, and devices in said discharge compartment and engaging the feeding surfaces of said feeding belts to clean the latter before they leave said discharge compartment, said cleaning devices comprising spring actuated scraper plates extending across said feeding belts and yielding against excess pressure in said discharge compartment.

5. In a machine for feeding subdivided meat and like material, the combination of a casing containing inlet and discharge compartments, spaced pressure plates in said casing forming a passageway connecting said compartments, driving belts mounted for movement in said inlet compartment towards each other and towards and between said pressure plates and through said discharge compartment, and feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, said discharge compartment being enclosed and provided with a restricted outlet opening facilitating producing pressure on the material in said discharge compartment by the feeding of said material into said discharge compartment.

6. In a machine for feeding subdivided meat and like material, the combination of a casing containing inlet and discharge compartments, spaced pressure plates in said casing forming a passageway connecting said compartments, driving belts mounted for movement in said inlet compartment towards each other and towards and between said pressure plates and through said discharge compartment, feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, and devices in said discharge compartment and engaging the feeding surfaces of said feeding belts to clean the latter before they leave said discharge compartment, said discharge compartment being enclosed by said cleaning devices and provided with a restricted outlet opening facilitating producing pressure on the material in said discharge compartment by the feeding of said material into said discharge compartment.

7. In a machine for feeding subdivided meat and like material, the combination of a casing containing an inlet compartment and an enclosed discharge compartment, spaced pressure plates in said casing forming a passageway connecting said compartments, driving belts mounted for movement in said inlet compartment towards each other and towards and between said pressure plates and through said discharge compartment, and imperforate feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, said driving and said feeding belts being endless and wholly contained in said casing, rollers in said casing supporting said belts, shafts supporting said rollers, and gearing connecting said shafts to drive said belts at substantially the same rate of speed.

8. In a machine for feeding subdivided meat and like material, the combination of a casing containing inlet and discharge compartments, spaced pressure plates in said casing forming a passageway connecting said compartments, driving belts mounted for movement in said inlet compartment towards each other and towards and between said pressure plates and through said discharge compartment, and feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, said feeding belts being of elastic material facilitating the forming of feeding pockets therein by the lateral pressure thereon of the material being fed, said driving belts providing therein spaced recesses for receiving the pockets formed in said feeding belts.

9. In a machine for feeding subdivided meat and like material, the combination of a casing containing inlet and discharge compartments, spaced pressure plates in said casing forming a passageway connecting said compartments, driving belts mounted for movement in said inlet compartment towards each other and towards and between said pressure plates and through said discharge compartment, and feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, said feeding belts being of elastic material facilitating the forming of feeding pockets therein by the lateral pressure thereon of the material being fed, said driving belts being of flat flexible material having trailing flaps cut therefrom and connected at their leading edges therewith and providing recesses for receiving the pockets formed in said feeding belts when said flaps are free to move from the planes of said driving belts.

10. In a machine for feeding subdivided meat and like material, the combination of a casing containing inlet and discharge compartments, spaced pressure plates in said casing forming a passageway connecting said compartments, driving belts mounted for movement in said inlet compartment towards each other and towards and between said pressure plates and through said discharge compartment, and feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, said feeding belts being of elastic material facilitating the forming of feeding pockets therein by the lateral pressure thereon of the material being fed, said driving belts being of flat flexible material having trailing flaps cut therefrom and connected at their leading edges therewith and providing recesses for receiving the pockets formed in said feeding belts when said flaps are free to move from the planes of said driving belts, said pressure plates moving said flaps into the planes of said driving belts and flattening the pockets in said feeding belts.

11. In a machine for feeding subdivided meat and like material, the combination of a casing containing inlet and discharge compartments, spaced pressure plates in said casing forming a passageway connecting said compartments, driving belts mounted for movement in said inlet compartment towards each other and towards and between said pressure plates and through said discharge compartment, and feeding belts of flat material carried respectively by said driving belts for movement through said inlet compartment and between said pressure plates and through said discharge compartment, whereby material to be fed is engaged in said inlet compartment by said feeding belts and fed thereby between said pressure plates and into said discharge compartment, said feeding belts being of elastic material facilitating the forming of feeding pockets therein by the lateral pressure thereon of the material being fed, said driving belts comprising chains and cross members carried thereby for supporting said feeding belts.

12. In a machine for feeding subdivided meat and like material, the combination of a casing containing an inlet compartment and an enclosed discharge compartment, spaced pressure plates forming a restricted passageway between said compartments, said passageway being relatively thin and wide, and feeding means movable through said passageway for feeding material from said inlet compartment through said passageway and under pressure into said discharge compartment.

13. In a machine for feeding subdivided meat and like material, the combination of a casing containing an inlet compartment and an enclosed discharge compartment, spaced pressure plates forming a restricted passageway between said compartments, said passageway being relatively thin and wide, and feeding means continuously movable through said passageway for feeding material from said inlet compartment through said passageway and under pressure into said discharge compartment.

14. In a machine for feeding subdivided meat and like material, the combination of a casing containing inlet and discharge compartments, spaced pressure plates forming a restricted passageway between said compartments, said passageway being relatively thin and wide, and feeding means movable through said passageway for feeding material from said inlet compartment through said passageway and into said discharge compartment, said discharge compartment being enclosed and provided with a restricted outlet opening facilitating producing pressure on the material in said discharge compartment by the feeding of said material into said discharge compartment.

15. In a machine for feeding subdivided meat and like material, the combination of a casing containing inlet and discharge compartments, spaced pressure plates forming a restricted passageway between said compartments, said passageway being relatively thin and wide, and feeding members movable in said inlet compartment and converging towards said pressure plates and continuously movable therebetween into said discharge compartment, said members exerting lateral pressure on material between them in said inlet compartment and feeding said material through said passageway into said discharge compartment, said discharge compartment being enclosed and provided with a restricted outlet opening facilitating producing pressure on the material in said discharge compartment by the feeding of said material into said discharge compartment.

AUGUST J. MEYER.